United States Patent [19]

Choi et al.

[11] Patent Number: 4,829,492

[45] Date of Patent: May 9, 1989

[54] DEPTHFINDER WITH COLOR LCD DISPLAY

[75] Inventors: Oong Choi, Lancaster; Robert S. Choi, Mountsville; Jude Buckwalter, Lancaster, all of Pa.

[73] Assignee: Woodstream Corporation, Lititz, Pa.

[21] Appl. No.: 890,455

[22] Filed: Jul. 30, 1986

[51] Int. Cl.$^4$ .............................................. G01S 9/68
[52] U.S. Cl. .................................. 367/110; 367/111; 367/108; 181/124
[58] Field of Search ............... 367/108, 111, 112, 900, 367/113, 11, 110; 350/335; 73/290 V; 340/621; 181/124

[56] References Cited

U.S. PATENT DOCUMENTS

| | | | |
|---|---|---|---|
| 3,845,462 | 10/1974 | Blue et al. | 340/3 R |
| 3,964,012 | 6/1976 | Yamamoto et al. | 340/3 C |
| 3,986,160 | 10/1976 | Turner | 367/110 |
| 4,104,609 | 8/1978 | Minegishi et al. | 367/111 |
| 4,281,404 | 7/1981 | Morrow, Jr. et al. | 367/108 |
| 4,290,125 | 9/1981 | Honda | 367/110 |
| 4,328,493 | 5/1982 | Shanks et al. | 340/784 |
| 4,344,065 | 8/1982 | Erwin et al. | 340/29 |
| 4,369,508 | 1/1983 | Weber | 367/115 |
| 4,396,250 | 8/1983 | Wada et al. | 350/335 |
| 4,397,008 | 8/1983 | Ziese | 367/113 |
| 4,420,824 | 12/1983 | Weber | 367/98 |
| 4,439,844 | 3/1984 | Menin | 367/87 |
| 4,556,286 | 12/1985 | Uchida et al. | 350/335 |
| 4,578,672 | 3/1986 | Oota et al. | 340/702 |
| 4,581,608 | 4/1986 | Aftergut et al. | 304/704 |
| 4,597,069 | 6/1986 | Milano et al. | 367/95 |
| 4,644,512 | 2/1987 | Grilk | 367/111 |
| 4,651,309 | 3/1987 | Honda | 367/108 |

FOREIGN PATENT DOCUMENTS 0068280 1/1979 Japan .
0114871 8/1980 Japan .
0048676 3/1982 Japan .
0061970 4/1982 Japan .

OTHER PUBLICATIONS

Information Display–(vol. 1; No. 9, p. 31 of Sep. 1985).
Japanese Electrical & Electronics (JEE), Apr. 1977, No. 124, pp. 43–45.
Journal of the British IRE–4, Nov. 1962, pp. 415–422.

Primary Examiner—Thomas H. Tarcza
Assistant Examiner—Daniel T. Pihulic
Attorney, Agent, or Firm—Holman & Stern

[57] ABSTRACT

A depthfinder has a color LCD display without a polarizer. This permits viewing of the display in bright sunlight, such as would be ordinarily used for fishing, without washing out of the display. Additionally, the provision of a LCD display without a polarizing filter permits viewing of the display even by a fisherman wearing polarized sunglasses without rainbow effects or fringing effects. A microprocessor is employed to drive a color LCD display, the display having two primary colors red and green, which can be combined to form a yellow color. Additionally, a fourth color exists when the overlying pixel elements are in an off state, the color being black. A program memory provides multicolor display functions including zoom, numeric indications and numeric adjustments, and a vertical line of a predetermined color to separate the halves of a split screen zoom display.

6 Claims, 10 Drawing Sheets

SONAR OPERATION

DEPTHFINDER WITH COLOR LCD DISPLAY

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field Of The Invention:

The present invention relates to depthfinders for detecting fish and bottom depth, and for displacing a two-dimensional output in the form of a color LCD display device which does not "wash out" in bright sunlight.

2. The Prior Art:

A depthfinder/fishfinder is shown in U.S. Pat. No. 4,597,069 to Milano et al, wherein a microprocessor is used to supply information to a digital display. A digital multiplexer interfaces with the microprocessor and with an alarm, a depth measurement and a keel offset. A sonar transducer and transceiver are used to supply information to the microprocessor. An alarm is provided which has a repetition rate proportional to the number and size of fish detected. The depth of fish detected is displayed as well. Flowcharts are illustrated in this reference showing the various routines and functions performed by the microprocessor.

In Oota et al, U.S. Pat. No. 4,578,672 a color liquid crystal display device is shown which is capable of displaying three primary colors on a transparent substrate. A light source is required behind a panel through which light is projected, the three primary colors being combined in this way to permit formation of additional colors visually.

A color display system for use with ultrasonic sonar is shown in Yamamoto et al, in U.S. Pat. No. 3,964,012. Targets such as the surface and bottom of the sea, and schools of fish detected can be displayed in different colors according to this reference. The colors red, green, and blue are specifically provided for. Light-emitting diodes (LED's) are energized and are mounted upon a rotary disc of a flasher-type display device and are energized or turned on independently or in combination, depending upon the target intensity. A display element requires a neon bulb, an electric motor for turning the rotary disc, and a suitable slip-ring connection to a sonar transmitter/receiver.

A sonar signal processing device, combined with a color display using a color cathode ray tube, is shown in Blue et al in U.S. Pat. No. 3,845,462. Here, three primary colors are used in the cathode ray tube to generate additional colors for use with a sonar display.

U.S. Pat. No. 4,328,493, to Shanks et al, shows a liquid crystal color display having a cathode ray tube and two color selective polarizers. A cell is switched in synchronism with different images supplied to the cathode ray tube. Two colors are specifically shown as produced in the device, these colors being green and red.

A color CRT display system for fish detectors is shown in Japanese patent No. 57-114871(A) in the name of Keisuke Honda et al, wherein a color CRT device is shown which detects fish as well as a profile of the underwater surface. Echo signals are used to generate the display.

In U.S. Pat. No. 4,556,286 to Uchida et al, relates to a multilayer guest-host liquid crystal display without polarizers. Here, at least two guest-host liquid crystal cells are superimposed one upon another, to produce a display. A colored image is created. Unlike prior art devices, no polarizer is required. A substantially clear image is thereby created corresponding to the pattern of the electrodes against the colored background. A high contrast image is produced against a colored background by the application of a relatively low voltage between the electrodes.

U.S. Pat. No. 4,396,250 to Wada et al shows a multi-layer guest-host liquid display without polarizers. This device has two guest-host liquid crystal cells superimposed upon each other.

A sonar apparatus having improved gain control is shown in U.S. Pat. No. 4,420,824 to Weber. Here, a microprocessor is used together with a digital display to indicate depth as a function of time required to receive echo signals. An LED or liquid crystal display is taught as being usable in this patent. The microprocessor uses appropriate software to provide output of digital signals in communicating with the display and other devices.

SUMMARY OF THE INVENTION

The present invention relates to a depthfinder for displaying an underwater surface and fish or other objects in the water. The display itself employs color LCD (Liquid Crystal Display) technology so that a plurality of colors are produced.

A preferred type of liquid crystal display is a phase change-type display used in transmissive as well as reflective modes. Behind the LCD is a cold cathode fluorescent tube. As cells are turned on, light is allowed to come through. The color seen depends upon the mask through which the light is allowed to come. The mask in a preferred embodiment would be either a red color or a green color, but may include other colors as well, and the present invention is not limited to the use of only two primary colors. Polarizers are required for the on/off function of the individual cell (pixel). A display arrangement according to the preferred embodiment would include apparatus as follows, beginning from the back of the display:

A cold cathode fluorescent tube; a glass layer; a polarizer; the LCD's; another polarizer; a glass sheet; and colors imprinted upon the glass sheet.

The colors on the LCD display are printed upon the front of the display, and have diffusion properties which "re-scrambles" the light so as to tend to remove the polarization of the light.

A particular advantage of the present invention is that it is highly visible even in bright sunlight, thus overcoming disadvantages of the use of CRT displays. The preferred display according to the present invention can be viewed through polarized sunglasses without "fringes" and "rainbow effects" which are associated with the use of polarized sunglasses in other types of LCD displays. This advantage is due to the re-scrambling of the light by the colors disposed on the glass as discussed above.

The use of LCD color technology for a depth finder display overcomes the disadvantages of using a cathode ray tube in bright sunlight in which such displays are often viewed. A fisherman, for example, can clearly observe the color display in bright sunlight, without fringe effects or rainbow effects, since the present invention uses a color LCD display which required no polarizing filters. When conventional LCD displays are viewed by a person wearing sunglasses which are polarized, undesirable rainbow and fringe effects occur due to the use of a polarizer with the conventional types of color displays with polarized filters.

The color display of the present invention produces two colors directly, namely red and green, and by superposition, a third color, yellow. A fourth color exists when none of the superimposed elements is actuated in a particular region, wherein the background color of the screen is visible. This color may preferably be, for example, black.

A microprocessor is used for system timing and control, memory control, and "X and Y" (i.e., horizontal and vertical coordinate) drive for driving the color display, and a signal analyzer and sonar control are used. A chart memory and program memory are used, as well as a panel control.

The microprocessor displays the underlying surface in two colors, the uppermost thin layer of the surface being indicated in a first color and the second color being used to solidly "fill in" the area beneath the uppermost surface. This permits ready identification of the underlying surface.

The fish are also in a preferred embodiment indicated in yellow, the uppermost layer of the underlying surface being also indicated in yellow, the surface being "filled in" in green, with red, yellow, and green colors being variously used for other indicating features on the display and for displaying of various features of the apparatus.

Electronic recall memory permits display review functions, to indicate what function is being used with the current display. A review screen position indicator is used to schematically indicate the location in memory of a particular function being used, relative to total available screen memory.

The entire screen can be used to display either a normal view or a magnified view. In a preferred embodiment of the present invention, a selectable feature permits two views to be simultaneously presented side by side, so as to place a magnified view in better perspective alongside the normal view. A readily visible red vertical line separates the two views to provide a clear and understandable display.

DETAILED DESCRIPTION OF THE INVENTION

Figure 1:
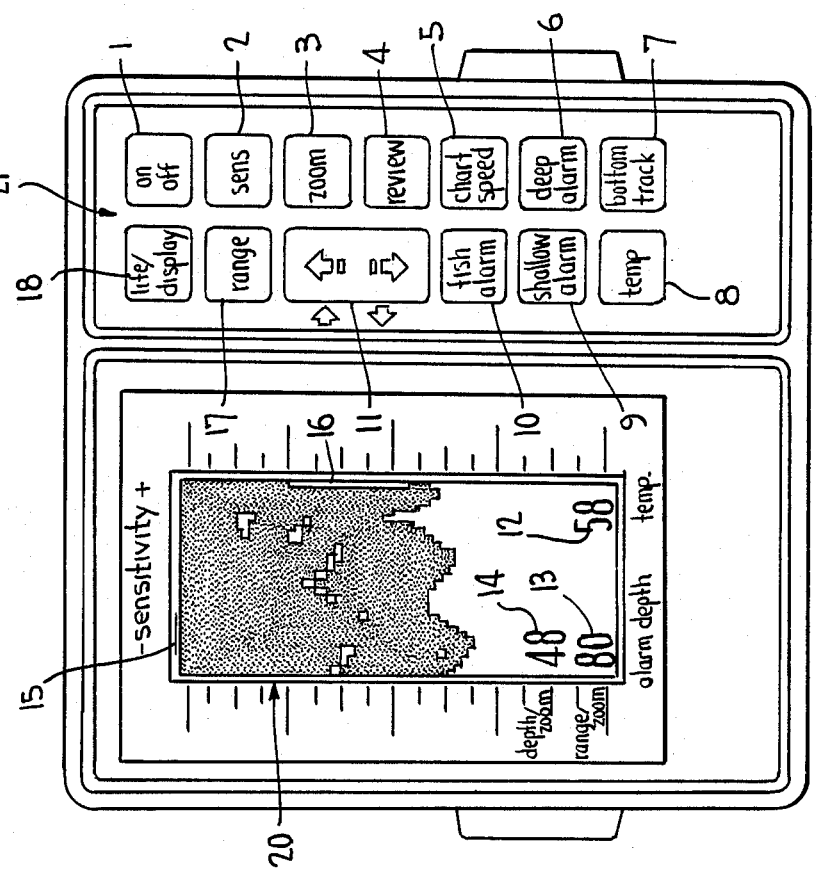
FIG. 1 is a front elevational view of a control panel and display according to the present invention.

FIG. 1 illustrates a depthfinder for use in fishing and water sports showing an LCD color display 20, and a control panel 21.

An on/off button 1 controls power to the device, and a manual sensitivity button 2 permits overriding of automatic sensitivity functions. A split-screen zoom button 3 permits display of an enlarged region side-by-side with the normal-sized display. The button 4 controls review and stop action, and the chart speed is controlled by button 5. A "deep alarm" button 6 permits setting of a "deep" alarm, and a bottom track button 7 is provided. Temperature button 8 is provided together with a shallow alarm button 9, a fish alarm button 10, and up and down arrows 11. Button 17 controls the range, and button 18 controls the display brightness. On the face of the output display 20 is indicated a temperature reading 12, a full-screen depth range, and a current depth reading 14 in numerals. A sensitivity bar 15 is shown at the top of the output display to indicate the sensitivity setting. A zoom bar 16 illustrates the region which is enlarged for display when the zoom function is used.

Figure 2:
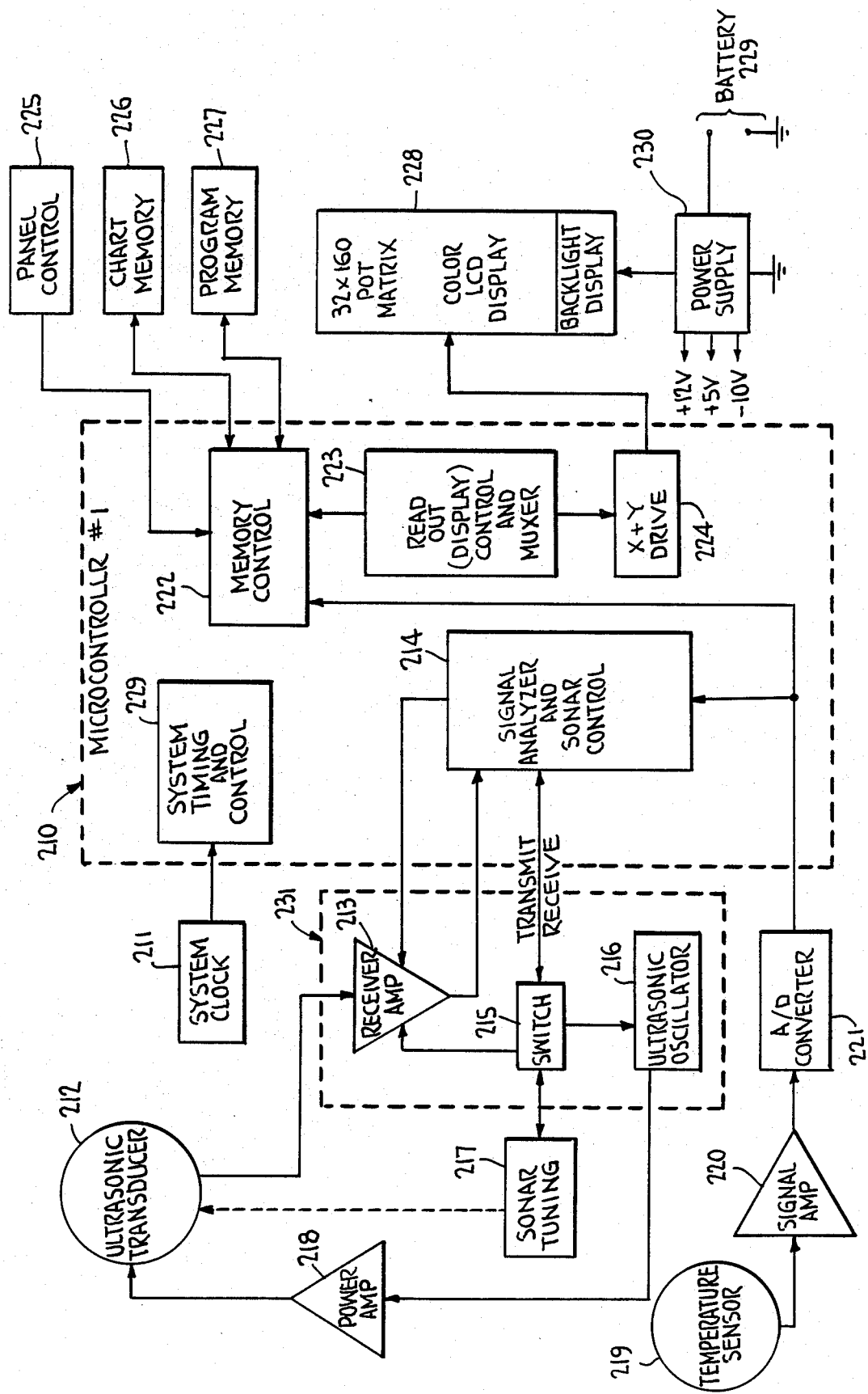
FIG. 2 is a block diagram of the circuit elements used in the present invention.

FIG. 2 illustrates a block diagram of the circuitry used in the present invention. A microcontroller 210 is illustrated in dotted outline as containing a system timing and control function 229, a memory control 222, a signal analyzer and sonar control 214, a readout display control and multiplexer 223, as well as an X and Y drive 224.

The microcontroller shown can be any microprocessor capable of the foregoing functions, and a preferred microcontroller is a standard commercially available microcomputer having a commercial designation 80C31. However, any other commercially available microcomputer could be used with the present invention, so long as it is capable either alone or in combination with additional conventional elements of performing the foregoing functions. The "buttons" referred to hereinabove can be any manually operable elements capable of being switched or actuated.

A system clock 211 supplies signals to the timing control 229. An ultrasonic transducer 212 receives power from a power amplifier 218, and sends output signals to a receiver amplifier 213. The receiver amplifier 213 sends an output signal to the signal analyzer 214, which in turn transmits information to a switch 215. The switch 215 supplies signals to a sonar tuning circuit 217 which can control tuning for the ultrasonic transducer 212. The switch also sends an output signal to an ultrasonic oscillator 216, which supplies signals to the power amplifier 218.

The color materials according to the preferred embodiment have light diffusion properties as discussed above.

The switch 215 connects the tuning circuit to either the receiver amplifier 213 or the oscillator 216. In transmit mode, the switch 215 connects the tuning circuit 217 to the oscillator 216. In receiving mode, the switch 215 connects the tuning circuit 217 to the receiver amplifier 213.

The dotted outline indicating part no. 231 indicates a commercially available device. This device is listed in the parts list hereunder as part No. U20, and is a commercially available ultrasonic sonar transceiver manufactured by National Semiconductor Company as part No. LM 1812.

A temperature sensor 219 supplies signals to a signal amplifier 220, which in turn supplies output signals to an A/D analogue/digital converter 221. The converter 221 communicates with the memory control circuit 222 and with the signal analyzer and sonar control 214. The memory control 222 communicates with the display control and multiplexer 223, which in turn supplies signals to the X and Y drive 224. The drive 224 sends output signals to a 32 x 160 Dot Matrix Color LC display 228. Ohter display sizes are also contemplated as being within the scope of the present invention. The display 228 includes a backlight display.

The color LCD display 228 is a commercially available display which is supplied commercialy by Stanley Electric Co. Ltd. of Tokyo, Japan. This display preferably is a phase change color LCD with a polarizer. The display is preferably a color display of structure as discussed hereinabove. However, the use of any other liquid crystal color displays are contemplated as being within the scope of the present invention.

A power supply 230 supplies power to the display as well as to the other circuit elements from a 12 volt battery 229. A plurality of output voltages are preferably supplied by the power supply 230 at +12 V, +5 V, and −10 V. Any other suitable power supply can be used for supplying power to the circuit elements, and the particular power connections to each element are omitted in FIG. 2 for clarity.

The memory control 222 communicates with a chart memory 226 and a program memory 227. The panel control 225 supplies signals to the memory control 222.

DEFINITIONS OF SONAR TERMS

Sensitivity—the amount of amplification given by the sonar receiver.

Sensitivity Bar—horizontal line across the top of the LCD screen the length of which is proportion to the sensitivity of the sonar receiver.

Data column—a vertically organized area of memory into which data can be stored.

Sonar data—this is information relating time to the ultrasonic echoes that were received. The information is collected into a data column in which the relative position reflects the amount of time elapsed for a given return. This time information contains the location of all returning echoes be they bottom or be they fish or be they tires.

Descriptor—An acronym or abbreviation for a word or function relating to a mode or function, i.e. "MR" for manual range.

Arrow Keys—the two buttons on the front panel of the fencolor fish finder marked with up and down arrows. These keys can control any of the adjustable functions by depressing the button labeled with the desired function. When the arrow key has effect on a given function, a descriptor such a "MS" for manual sensitivity will appear in red in the lower right hand corner of the LCD screen.

Surface Clutter—noise found at the top of the sonar data column due to debris or other sound obstructions at the surface of the water.

Column Pointers—These are pointers that point to the memory address where the current sonar data is to be stored/found.

Display Pointer—the present apparatus uses two areas for the display. At any given instant one area is being displayed and one area is having new data drawn on it to be displayed later. The display pointers point to the memory addresses of these areas. When a complete display has been drawn the pointers are exchanged and the process starts again.

Zoom Window—the moveable area that is shown "zoomed up" enlarged when in the zoom mode.

Zoom Beginning—the depth where the top of the zoom "window" is.

Zoom End—the depth where the bottom of the zoom "window" is.

Alarm value—there are three alarms. They are: the deep alarm, the shallow alarm and the fish alarm. Each of these alarms have water depth values that are checked against actual conditions in the current sonar data column. When setting an alarm, its current value is shown in red in the lower left hand corner of the LCD screen.

Figure 3:
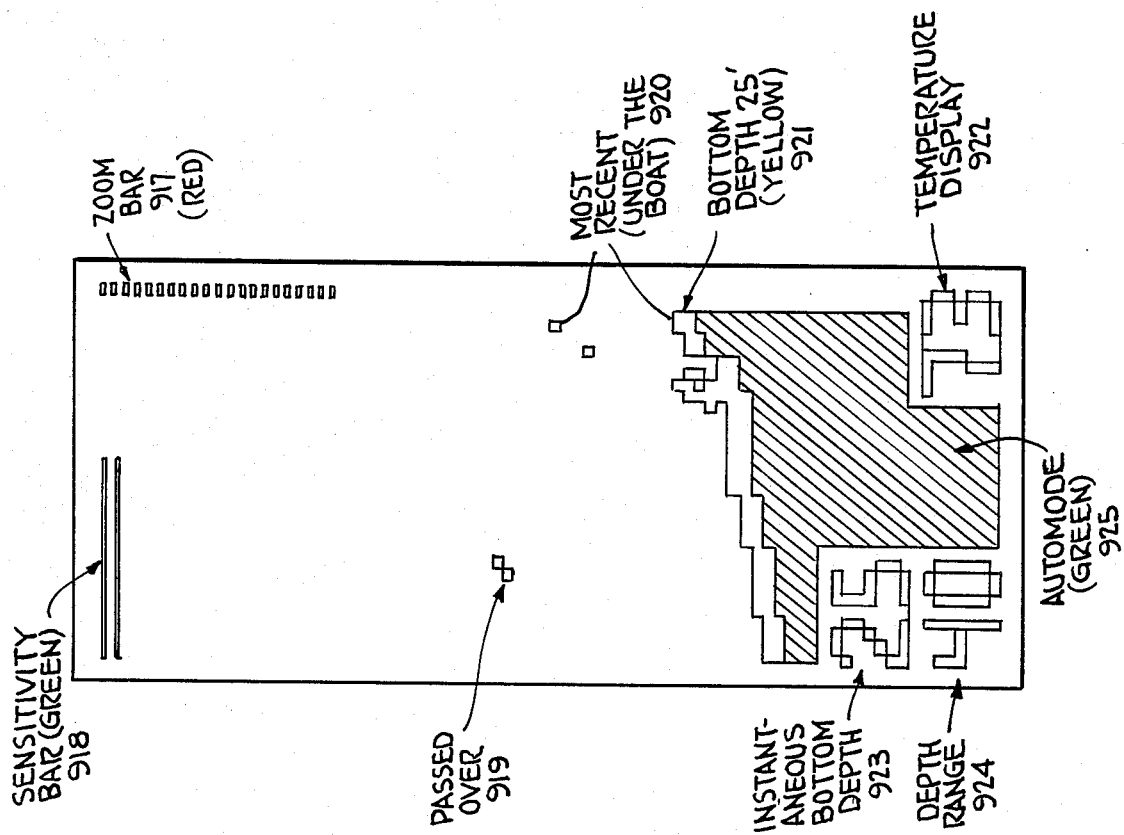
FIG. 3 illustrates a typical display.

FIG. 3 illustrates an LCD display according to the present invention. A sensitivity bar is illustrated in FIG. 3 as bar 918 near the top of the display. A zoom bar 917 is illustrated in red, and illustrates a region which would be enlarged, or which is being enlarged, on a "zoom screen" which can selectively be provided in a side-by-side relationship with the normal-sized display, the "zoom display" being shown on the left half of the screen shown in FIG. 3, with the right half of the screen shown in FIG. 3 remaining the same.

The display indicated at portion 920 represents the most recent signals displayed, namely the region directly under the boat supporting the depthfinder. The left-most portion of the screen illustrates portions of the underlying surface already passed over, such as those indicated by arrow 919 which indicates fish or floating objects in the water. The uppermost portion of the underlying surface is indicated at 921 in yellow, with the available area beneath the yellow portion being indicated by the green filled-in portion 925.

Temperature is displayed in region 922 in a color such as red for permitting a clear distinction from the green portion of the display underlying the yellow bottom surface. Likewise, the instantaneous bottom depth is indicated at portion 923, and represents the most recent depth sampling. Likewise, the depth range is indicated at region 924. All of the displays 922, 923, and 924 are software-driven displays controlled by instructions to the microprocessor 210.

Appendix I is a listing of the software instructions which are used by the microprocessor 210. These instructions, when used by the microprocessor 210, and in conjuction with the other circuitry of the present invention, enable the display to function as described herein.

The water surface is indicated at the uppermost portion of the display in FIG. 3 at the top of the zoom bar 17. No indication of a surface is present for the top water surface, since such is unnecessary and also since noise, waves, and the like would tend to "clutter" the image unnecessarily.

The flow charts illustrated in FIGS. 4–10 represent the functions of the program listed as Appendix I hereto, the flow charts shown in FIGS. 4–10 actually being part of a single flow process whose elements are interrelated as shown in the individual FIGS. 4–10.

Figure 4:
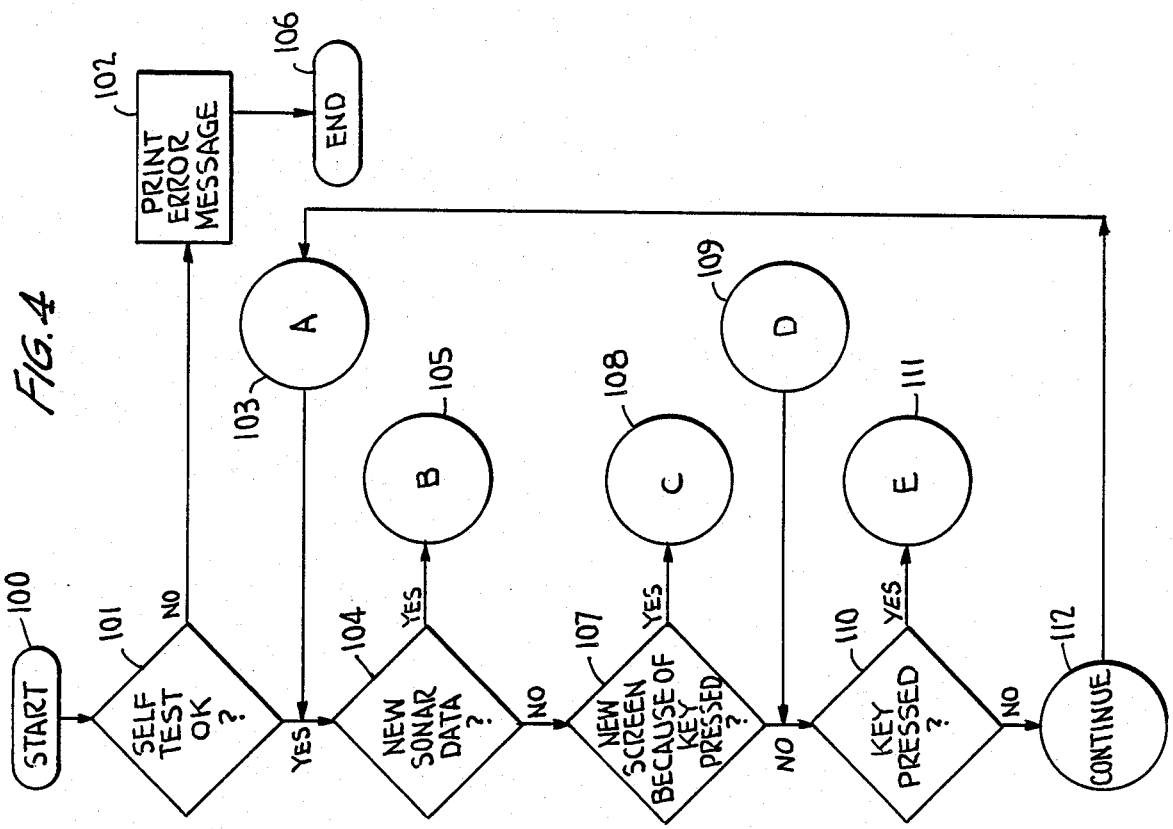
FIGS. 4–10 are flow charts which are part of a single flow chart, and which are illustrated separately for clarity.

In FIG. 4, block 100 represents the initiation of the program, such as would occur upon turning on of the apparatus. The apparatus self-tests at block 101, and if there is an error in the system an error message is printed according to block 102. Termination due to error occurs at 106.

If the self-test is OK, then at block 104 is a test for new sonar data. If new data has been received, the program branches to branch B indicated at 105. This branch begins on FIG. 5, and would ordinarily continue through the steps shown in FIGS. 6–9 until the program returns to location D indicated at block 109 which leads to decision block 110 which interrogates the system as to whether or not a key has been pressed.

If new sonar data at block 104 has not been received, then the program branches to block 107 which interrogates whether a new screen is required because of the key pressed. If yes, then the program branches to C, indicated at block 108, this branch of the program beginning at FIG. 6 and continuing on through FIGS. 7-9. If no new screen is required, the program branches to block 110 which has been discussed hereinabove.

Figure 10:
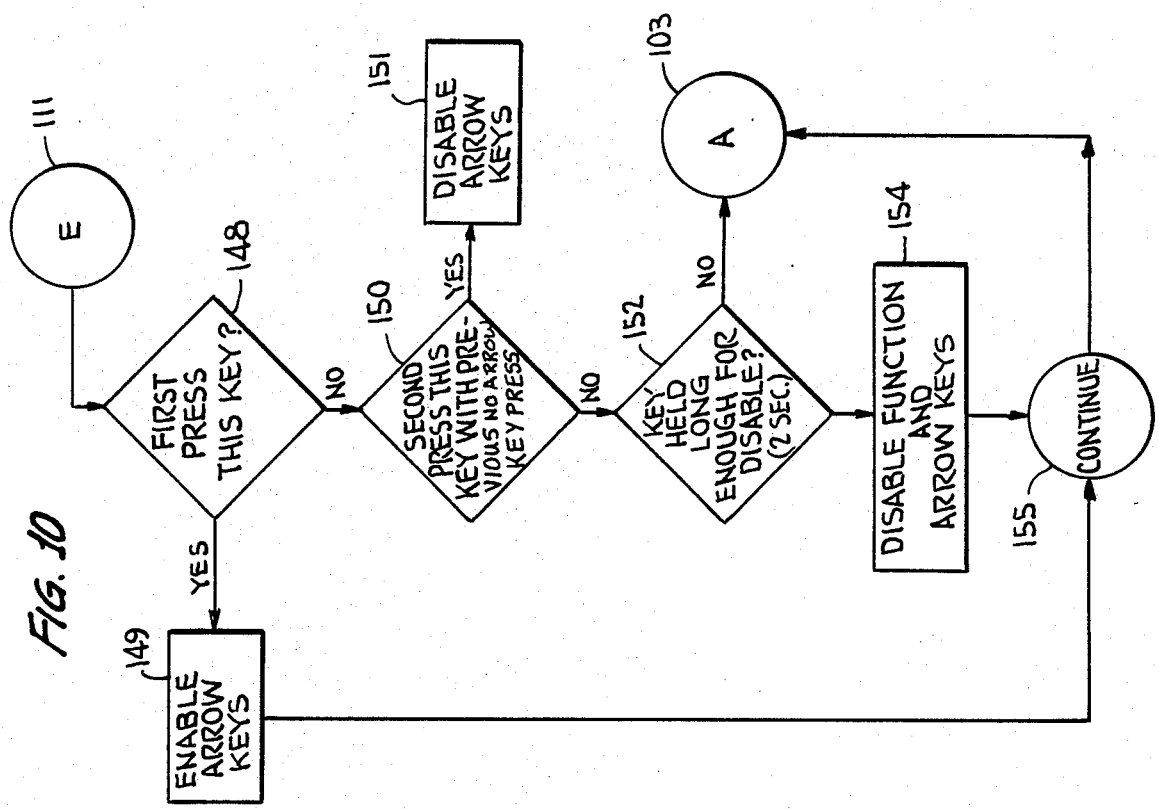

If a key has been pressed, then from block 110 the program branches to location E at block 111 which is illustrated in FIG. 10. FIG. 10 branches back to the program as shown in FIG. 4 at block A, indicated as location A at block 103 in FIG. 4.

If no key has been pressed at block 110, the program continues at block 112, which then returns to location A at block 103. Location A represents merely a location in the program, and not a subroutine.

Figure 5:
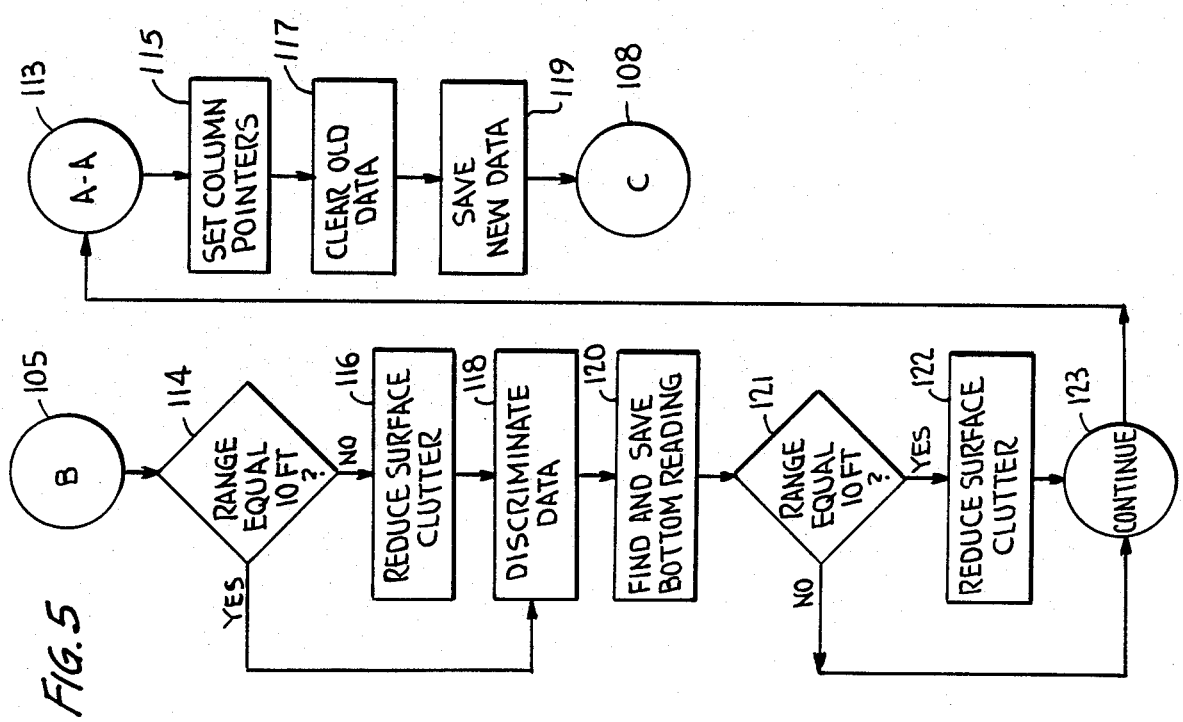

FIG. 5 illustrates the program flow chart beginning from location B which continues at a decision block 114 determining whether the range is equal to 10 feet.

If yes, it continues to block 118 where data is discriminated, and if no it continues at block 116 to reduce surface clutter.

The program continues at block 120 where the bottom reading is found and saved, and a decision block 121 determines whether the range is equal to 10 feet. If yes, surface clutter is reduced at block 122 and if no the program continues at block 123. Block 123 continues at block AA, block 113. Column pointers are set at block 115, and then old data is cleared at block 117. At block 119, new data is saved, and the program continues on to location C indicated at block 108.

Figure 6:
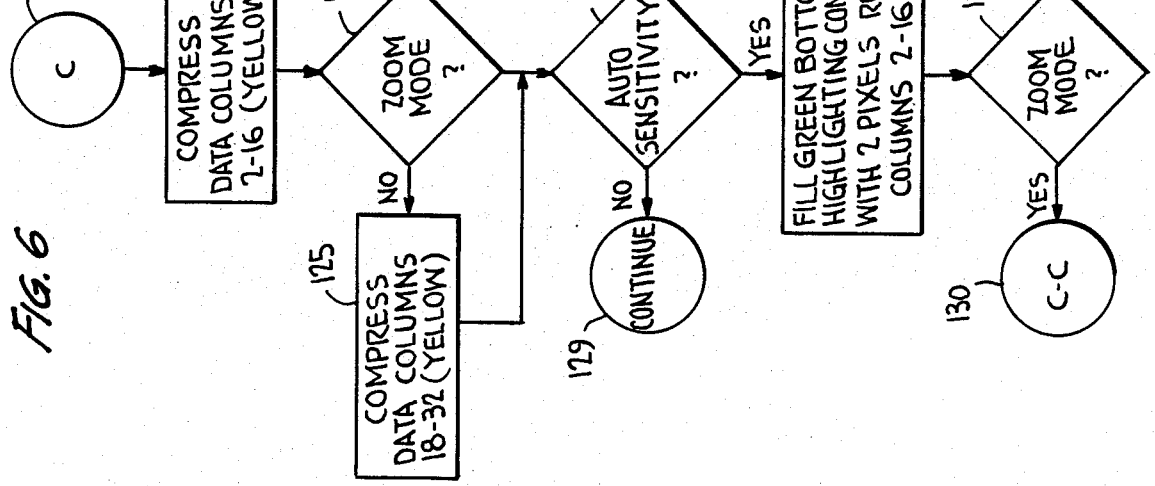

Block C begins at the top of FIG. 6, and continues at block 123 where data columns 2-16 (yellow) are compressed. A decision block 124 is arrived at which interrogates whether the program is in a "zoom mode". If yes, the zoom data is shown at block 126 by columns 1-15 in the display (yellow) and in column 18-32. Then, at block 128, a vertical red line is drawn in column 17, and a decision block 127 is reached as to automatic sensitivity. If the zoom mode at decision block 124 indicates that no zoom mode presently exists, block 125 is reached wherein data columns 18-32 are compressed, these columns being in yellow. The program then branches to decision block 127.

Figure 7:
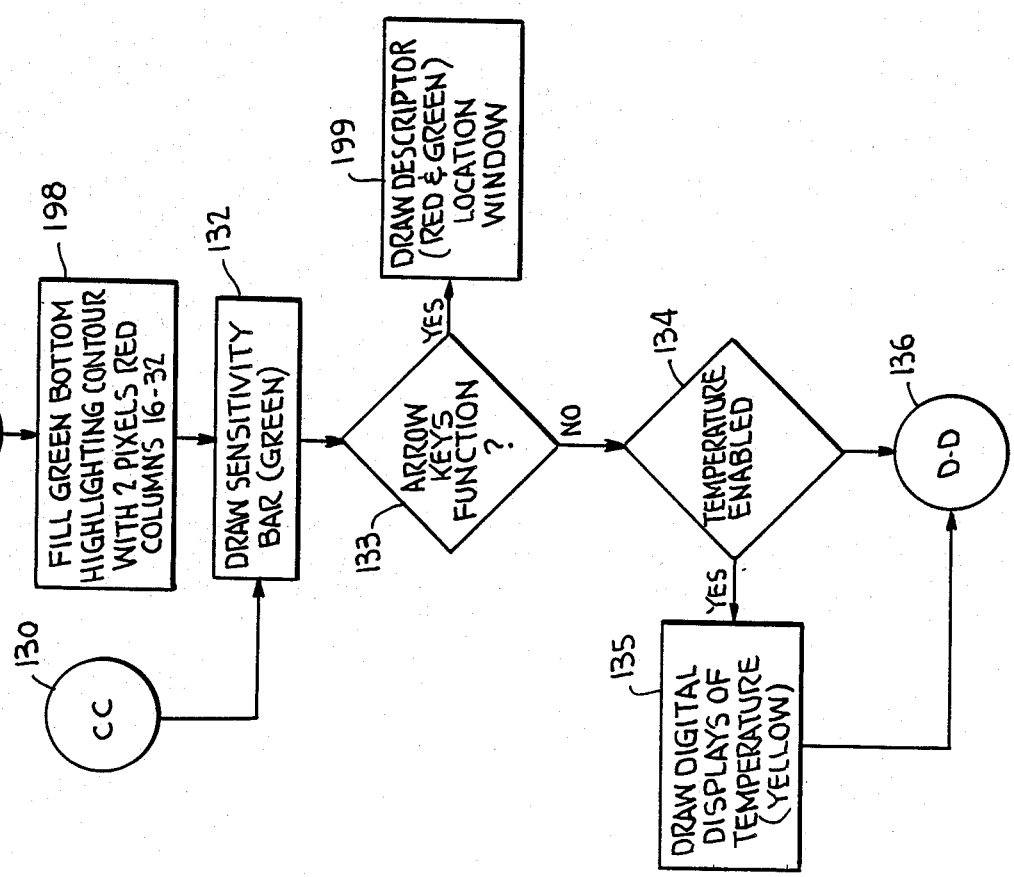

If the automatic sensitivity function is not in an "on" state, block 129 is reached which loops back to location C at block 108. If automatic sensitivity is to occur, i.e., the microprocessor itself is to determine under program control what sensitivity to use, then block 128 is reached which causes the display to fill the green bottom highlighting contour with two pixels of red (in columns 2-16). Then decision block 129 is reached, interrogating whether a zoom mode exists currently. If yes, the program branches to block 130 at location CC. If no zoom mode currently exists, the program branches to block 131 at location BB. Locations BB and CC are illustrated in FIG. 7.

From location B-B at block 131 the program continues to block 198 which causes the display to fill the green bottom highlighting contour with two pixels of red (columns 16-32). The program then continues to block 132 wherein the sensitivity bar is drawn in green on the display. From location point CC indicated at block 130, the programs continues directly to block 132 wherein the sensitivity bar is drawn. From block 132 the decision block 133 is reached, interrogating whether the arrow keys are used. If yes, block 199 is reached wherein a "descriptor" is drawn in red and green, in the review location window at location 22 illustrated in FIG. 11.

If the arrow keys function is not required at block 133, then decision block 134 is reached interrogating whether the temperature indicator is enabled. If yes, then at block 135 a digital display of the temperature is indicated in yellow at location 922 of FIG. 3. The program then continues to block 136 which is location DD. Block 136, which is location DD, continues on in FIG. 8 at the top of the figure. If the temperature function has not been enabled in block 134, then the program continues directly to block 136 at location DD.

Figure 8:
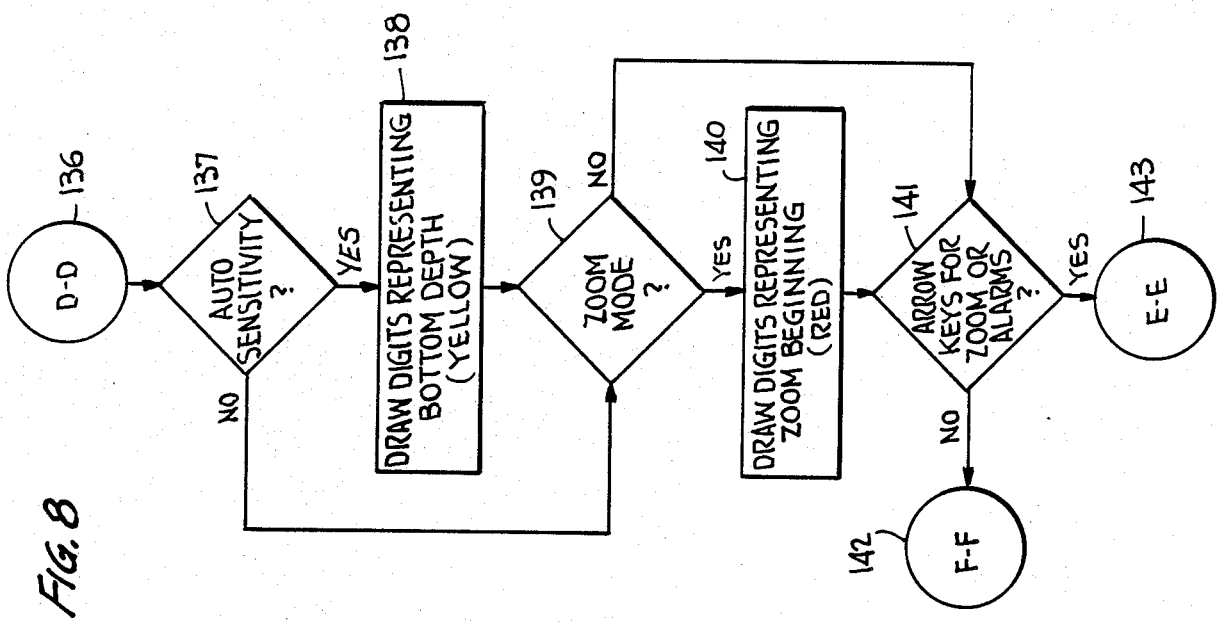

FIG. 8 begins with location DD at block 136 which continues to decision block 137 which tests whether the automatic sensitivity mode is on. If on, the program continues at block 138 causing digits to be displayed representing the bottom depth in yellow. Then decision block 139 is reached, interrogating whether a zoom mode is currently on.

If at block 137 the automatic sensitivity is not on, the program continues directly to block 139. At block 139, if the zoom mode is on, the program continues to block 140 and draws digits representing the zoom beginning portion in red. The program then continues to decision block 141. If the zoom mode is not on at block 139, the program continues directly to decision block 141, interrogating whether the arrow keys have been used for the zoom or for the alarms. If no, the program continues to block 142 in FIG. 9. If yes, the program continues to block 143, also in FIG. 9.

Figure 9:
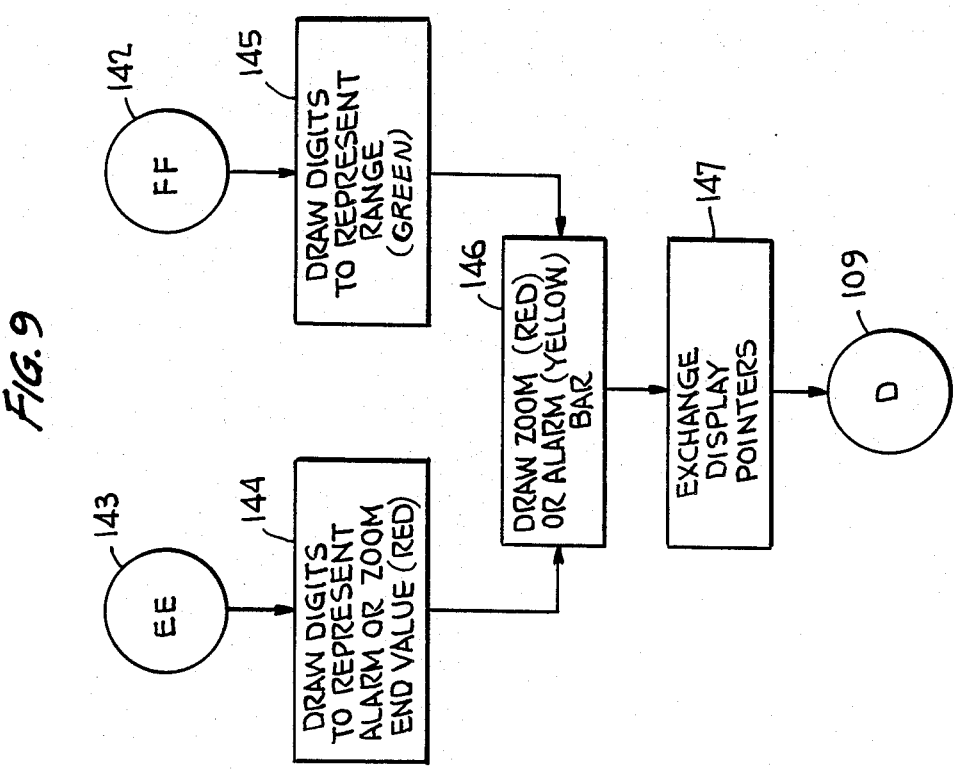

FIG. 9 begins at either block 143, which is location EE, or location FF indicated at block 142. If the arrow keys have been used at decision block 141, the program continues on to block 144 to draw digits on the display to represent the alarm or zoom end value in red. The program then continues to block 146. The digits drawn at block 144 would be displayed at the location indicated as location 924 in FIG. 3.

If no arrow keys have been set for the zoom or the alarm at block 141, the program then continues to block 145 and displays digits representing the range, in green. This is displayed at location 924 illustrated in FIG. 3. Then, the program continues to block 146.

At block 146, the program causes the display of a zoom bar in red, or alternatively an alarm bar in yellow, depending upon which of these have been set. The alarm bar would be located in the same column as the zoom bar for indicating an alarm depth at which an alarm will sound. For example, an alarm can be made to go off when water which is too shallow or too deep has been reached.

The program continues to block 147, wherein display pointers are exchanged. The program then continues to location D at 109 as shown in FIG. 4.

As mentioned above, from location D at 109 in FIG. 4 the program continues to decision block 110 which tests whether a function key is currently pressed. If no function key is currently pressed, then the program continues at location 112 and goes to location A at 103, from which point the program repeats, beginning at decision block 104, and tests for new sonar data. If, on the other hand, a function key is currently pressed, then from decision block 110 the program branches to location E at 111.

FIG. 10 illustrates the branch beginning at location E, at block 111.

The program continues from block 111 to decision block 148, wherein the program interrogates whether this is a first pressing of this function key. If yes, the arrow keys are enabled at block 149, and the program continues at block 155 and returns the program control to Location A indicated at 103 in FIG. 4. If the key has already been pressed at least once at block 148, then the program continues to decision block 150 wherein the program interrogates whether a second press of this function key has occurred with no previous press of an arrow key. If yes, the program continues to block 151 to disable the arrow keys. If no, the program continues to decision block 152.

At decision block 152, the program interrogates whether the function has been held down long enough for disablement, a period of 2 seconds. If no, the program continues to Location A at 103 in FIG. 4, and if yes the program continues to block 154 wherein the key function is disabled and the arrow keys are disabled. From there the program continues to Location A at 103 in FIG. 4 via block 155.

The key functions, as well as the setting of the arrow keys, are explained in more detail hereunder. The buttons shown in FIG. 1 numbered 2,3,4,5,6,9,10,17, and 18 can be adjusted by the pressing of one of the said buttons followed by manual actuation of the up or down arrow keys until a suitable adjustment has been reached (as indicated by the display appropriate to that button/function, as discussed hereunder). The changed feature, which has been changed by the depression of the UP and/or DOWN arrow keys, is "locked in" by the second pressing of the function which has been selected. This disables the arrow keys and returns the display to an appropriate setting. During the change operation wherein the arrows can be used to adjust the function selected by the above-identified buttons, a descriptor appears which describes the function selected, the descriptor appearing at location 22 as illustrated in FIG. 11.

The bottom tracking feature is selected by first pressing the ZOOM button 3 and then the bottom tracking button 7. The display can be frozen by depression of the review button 4.

Figure 11:
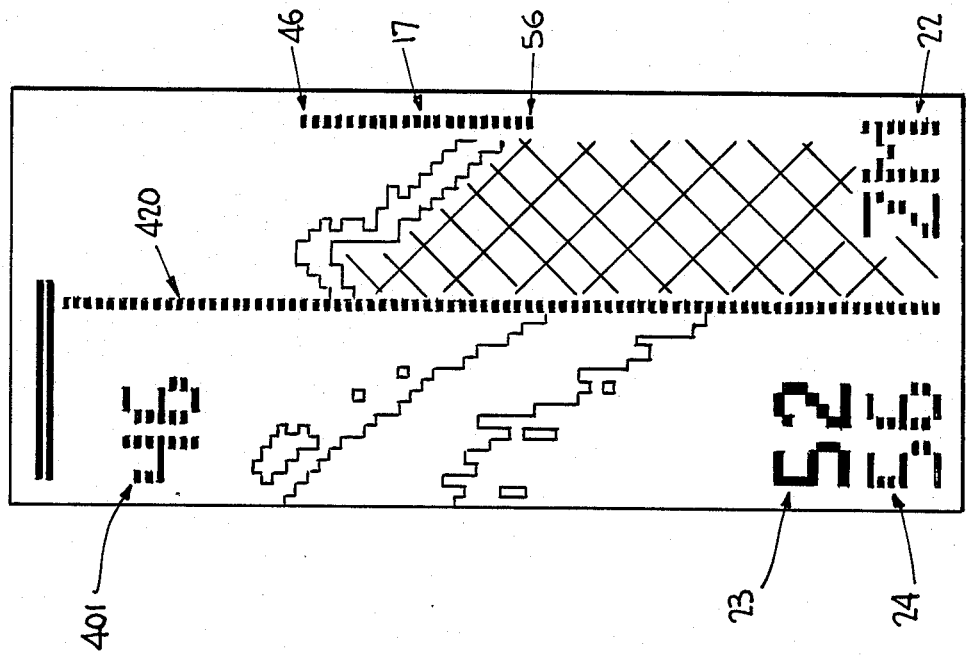
FIG. 11 shows a split-screen display.

The ZOOM feature is illustrated in FIG. 11, wherein the left portion of the screen illustrates the ZOOM region which is illustrated by the zoom bar 17. The top depth of the zoom window is illustrated in numerals at region 401 of the lefthand display portion, and the bottom depth of the ZOOM window is indicated in region 24 in numerals. The bottom depth is indicated numerically in region 23.

Figure 12:
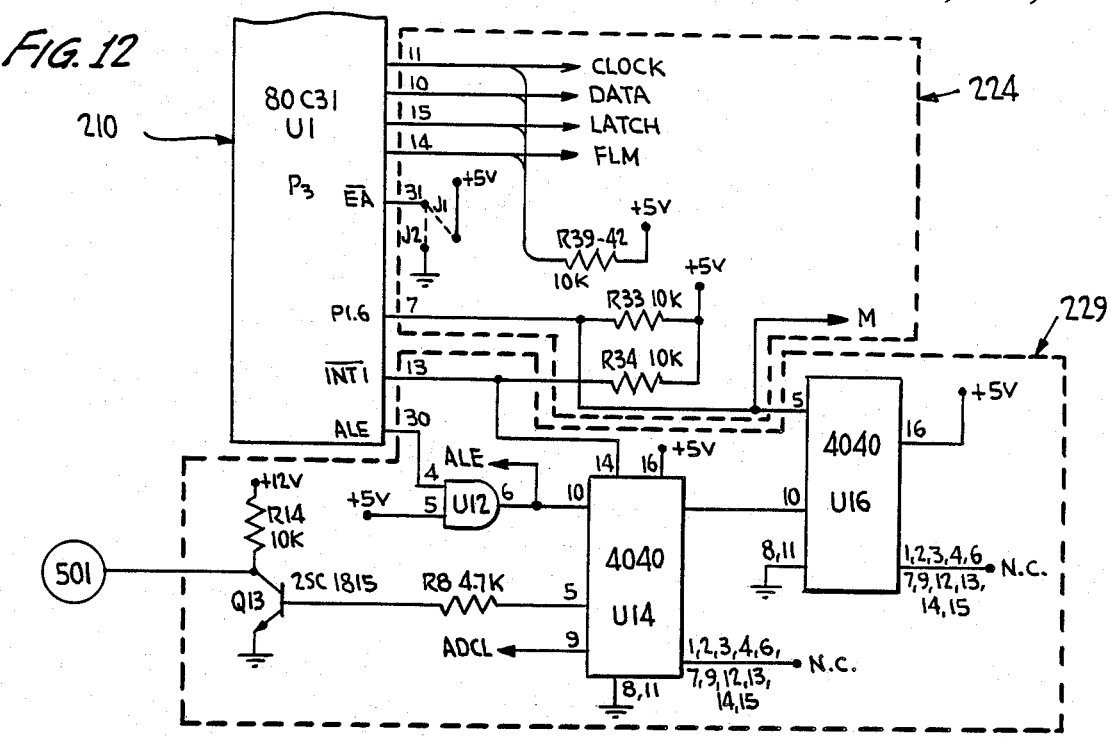
FIG. 12–18 show a circuit diagram, broken into separate figures for clarity.

FIGS. 12-18 together are a circuit diagram for the apparatus according to the present invention. FIG. 12 shows in dotted outline circuit elements 224 and 229, each of which cooperates with the microprocessor 210 to form the functional blocks of FIG. 2. Block 224 of FIG. 12 is the X and Y drive 224 of FIG. 2, while the block 229 cooperates with the microprocessor 210 to form the system timing and control functions 229 of FIG. 2.

Figure 13:
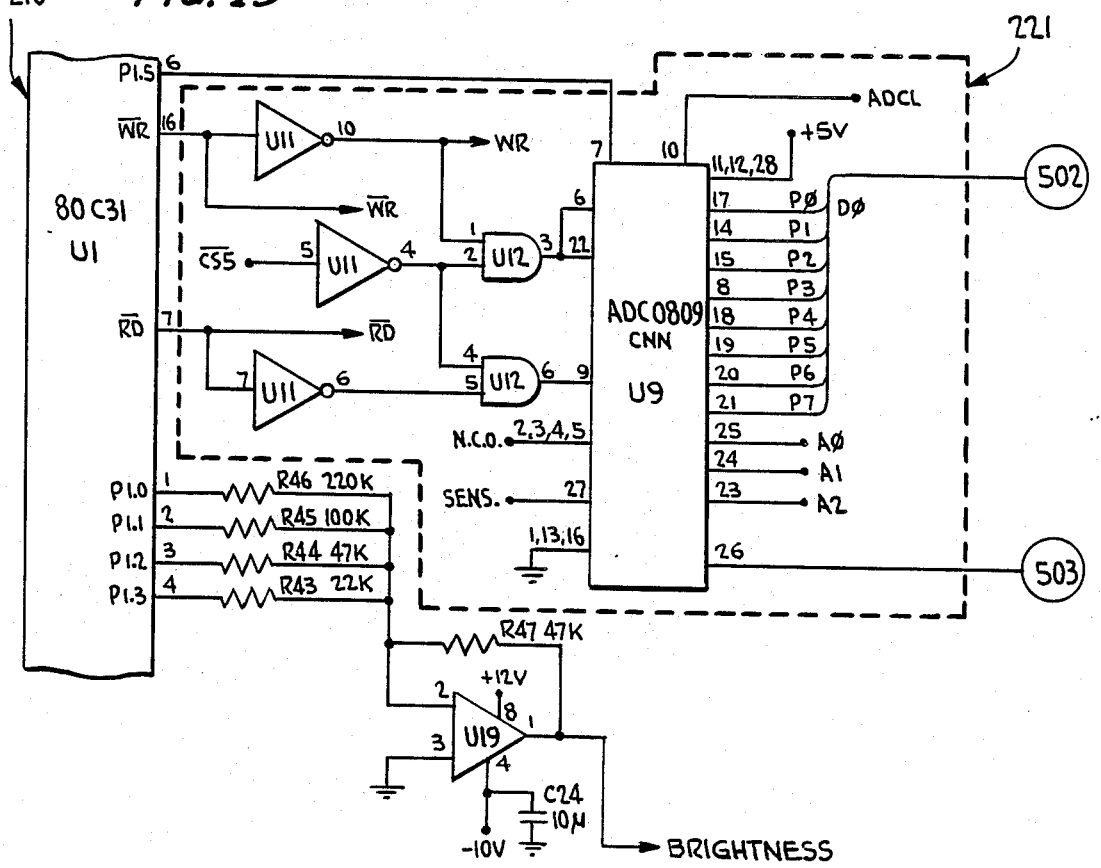

FIG. 13 shows another portion of the circuit including block 221, which corresponds to the A/D converter 221 of FIG. 2.

Figure 14:
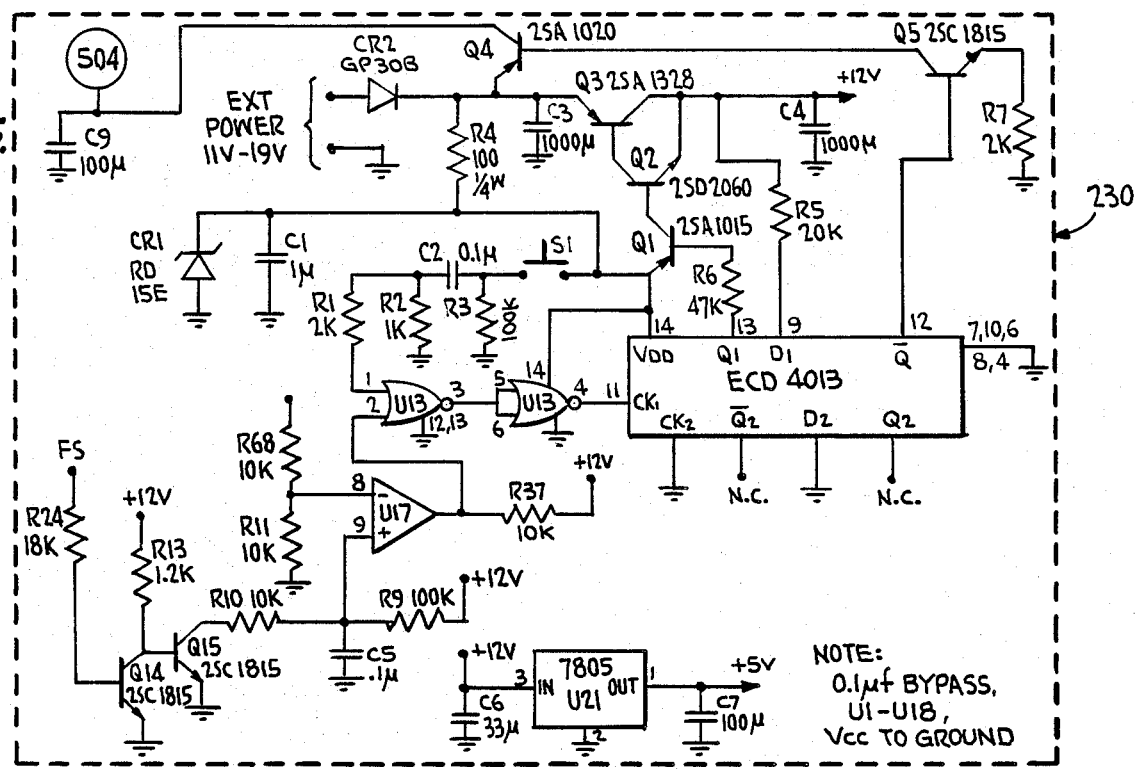

FIG. 14 illustrates the power supply 230 shown schematically in FIG. 2.

Figure 15:
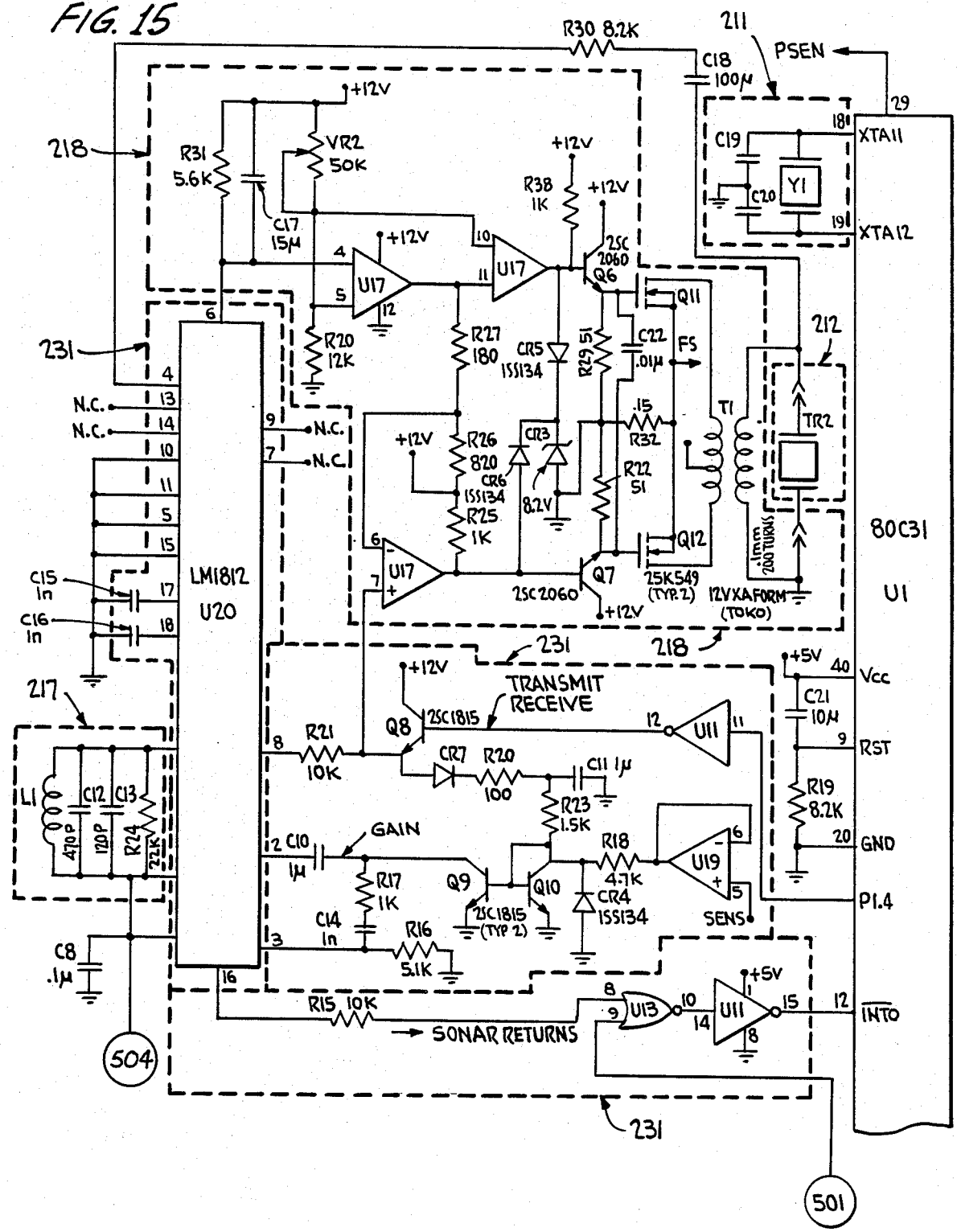

FIG. 15 illustrates the circuit portion 211, which corresponds to the system clock 211 of FIG. 2. Also shown is the power amplifier 218, and a sonar tuning circuit 217. The ultrasonic transducer 212 is shown in FIG. 15 in dotted outline as well. The dotted outline 231 of FIG. 15 includes the sonar return circuit, the GAI circuit, and the transmit/receive circuit, the elements of which are indicated in FIG. 2 schematically. The circuit of FIG. 15 connects to another portion of the circuit shown in FIG. 12, as indicated by the circled numeral 501.

Figure 16:
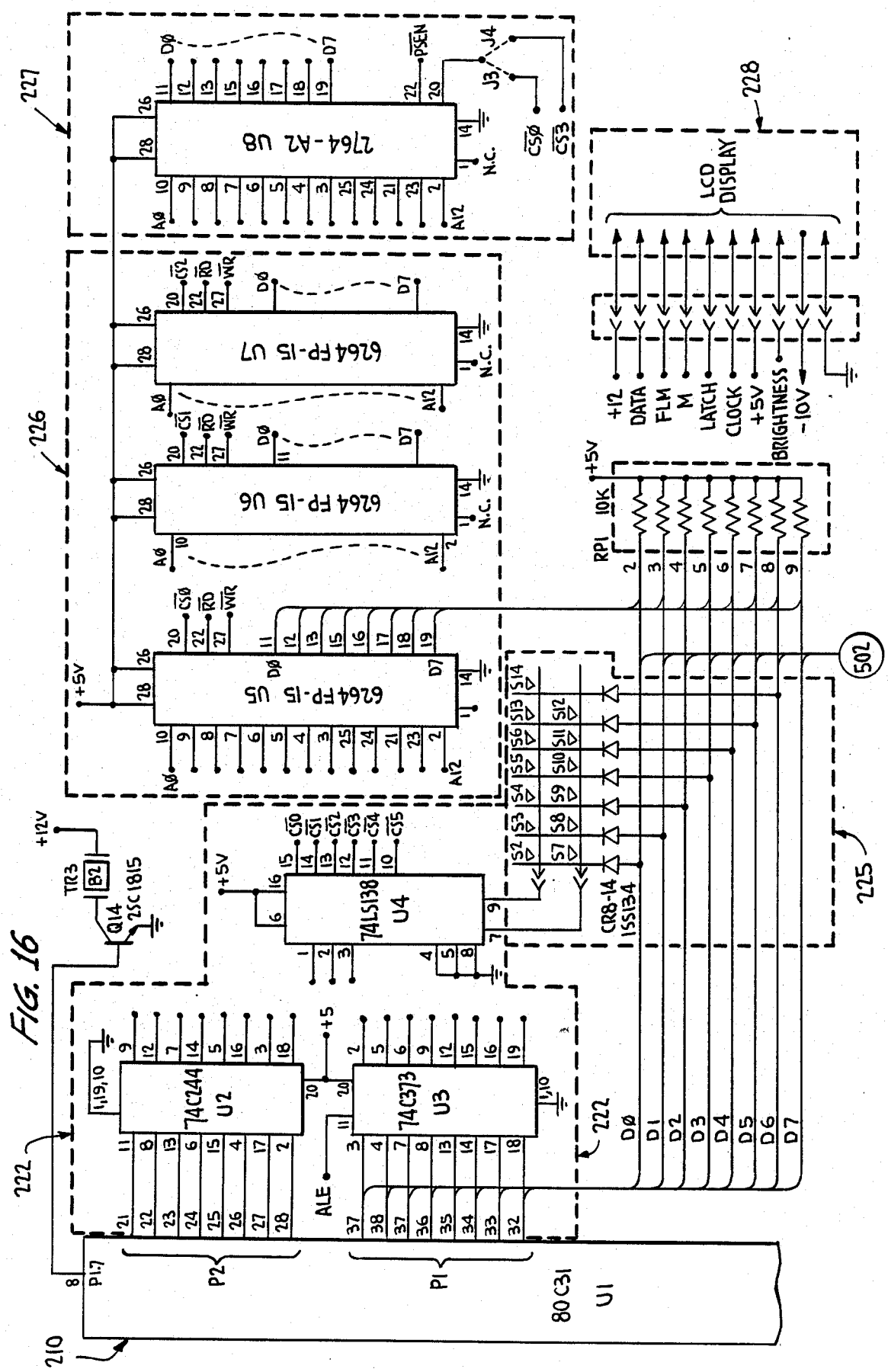

FIG. 16 illustrates another portion of the circuit diagram according to the present invention, including the memory control 222 (when taken in combination with the microprocessor 210 shown in FIG. 16). The dotted outline of circuit elements shown in FIG. 16 correspond to the schematic functional elements shown functionally in FIG. 2.

The panel control 225 is seen in FIG. 16, as is the program memory 227 and the chart memory 226. The memory control is shown in the dotted outline portion 222(also when taken with the microprocessor 210 of FIG. 16).

Portion 228 shown in FIG. 16 shows signals being received from various circuit portions which are supplied to an LCD display. The LCD display is preferably a 32 x 160 dot matrix color LCD display, having a backlight display. The LCD display is preferably of the type discussed hereinabove including a liquid crystal display with polarizer, which operates in a "transmissive" mode.

Figure 17:
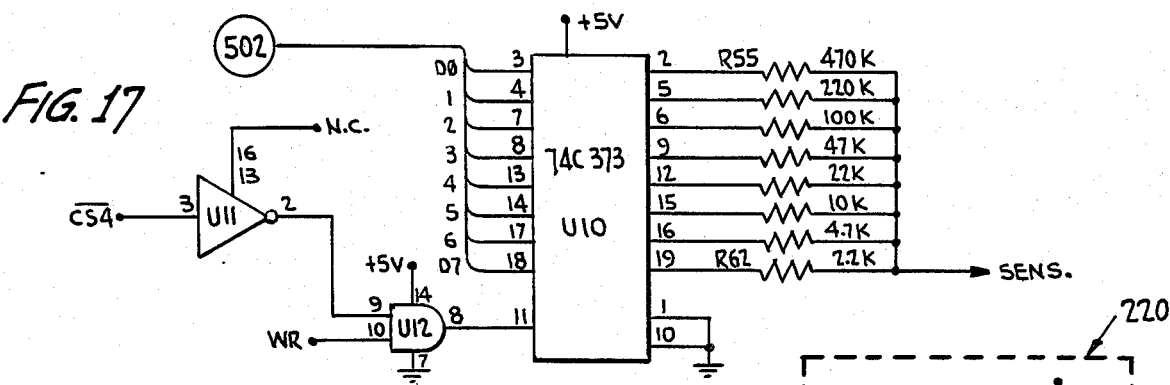

FIG. 17 illustrates another portion of the circuit which stems from the portion illustrated as the circled numeral 502, which branched from FIG. 16. This circuit is part of the gain adjustment.

Figure 18:
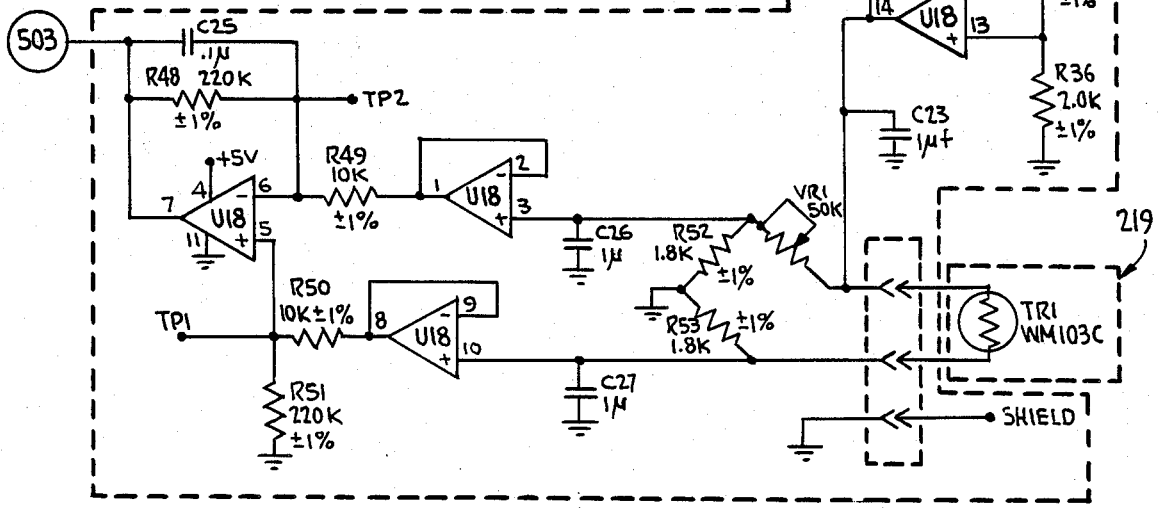

FIG. 18 has a branch illustrated by the circled numeral 503. The signal amplifier circuitry 220 is seen in FIG. 18, as is the temperature sensor 219.

OPERATION OF SYSTEM FEATURES

Pressing the SENS button will put the depthfinder into MANUAL SENSITIVITY mode. The sensitivity can be adjusted by pushing the UP/DOWN arrow keys.

The bottom will now be displayed in YELLOW and the current depth will no longer be displayed on the screen in digital form.

The "MS" descriptor will appear in the lower right corner of the display is RED. As long as the MS descriptor remains RED the sensitivity may be adjusted using the UP/DOWN arrow keys. When 10 seconds have passed without the SENS or arow keys being pressed, the MS descriptor will turn YELLOW indicating that changes in sensitivity will no longer be accepted unless the SENS button is pressed again.

The horizontal bar at the top of the screen indicates the current sensitivity level. This bar will lengthen for increased sensitivity (UP arrow key) and shorten for decreased sensitivity (DOWN arrow key). Once you have selected the desired sensitivity level, press the SENS button again. MANUAL SENSITIVITY is now set.

Pressing the RANGE button will put the CLC into the MANUAL RANGE mode and the MR descriptor will appear in RED in the lower right corner of the screen. As long as the descriptor is RED, the depth range may be adjusted. When 10 seconds have passed without the RANGE or UP/DOWN arrow keys being pressed, the MR descriptor will turn YELLOW, indicating that changes in range will no longer be accepted unless the RANGE button is pressed again.

The full screen depth range can be set. The range choices are 0-20, 0-40, 0-80, 0-160, and 0-320 feet. A 0-10 foot range is available either as a standard feature, or else only in ZOOM. The UP/DOWN arrow keys select the appropriate range. The UP arrow will select a deeper range, while the DOWN arrow will select a shallower range. If the arrow keys are pressed to extend the full screen range beyond its minimum or maximum ranges, a beep will be heard each time an arrow key is pressed.

Once the desired range is selected, the RANGE button is pressed again. The selected range is shown in the lower left corner of the display. In MANUAL RANGE, the bottom and any targets present will be displayed in YELLOW.

To return to AUTO RANGIG, it is necessary to press and hold the RANGE button for 2-3 seconds until a beep is no longer heard and the MR descriptor disappears. A GREEN bottom will return unless MANUAL SENSITIVITY is selected.

To activate the ZOOM mode, the ZOOM button is pressed once. The screen will split vertically into two screens separated by a red line. The ZOOM bar will now appear on the right side of the display in RED. The size of the ZOOM bar will always represent either a 10 or 20 foot window on the current full screen range, depending on the viewing window size selected. The ZOOM viewing window can be switched between 10 and 20 feet by pressing the ZOOM button while in the ZOOM mode. The right half of the screen will display information in the normal way, while the left half will display an expanded view of the area selected by the ZOOM bar.

The ZOOM bar is moved to the desired depth with the UP/DOWN arrow keys.

The top and bottom depths of the ZOOM window are displayed on the left side of the display, with the bottom depth in the lower left corner and the top depth in the upper left.

While in the ZOOM mode, the depth finder is continuing to collect data so that the most current information is displayed on the screen.

To exit the ZOOM mode, it is necessary to press and hold the ZOOM button down for 2-3 seconds until a beep is no longer heard and the ZM descriptor disappears from the screen.

To activate the Bottom Track feature, enter the ZOOM mode by pressing the Bottom Track button. Press the BOTTOM TRACK button a second time and the display will return to normal.

Just as in the normal ZOOM, the size of the ZOOM window is either 10 or 20 feet, selected by pressing the ZOOM button.

The depthfinder has a convenient REVIEW function which allows a viewer to look back over three full screens of information. REVIEW also allows the viewer to freeze the screen for a more in-depth look at the current screen. The viewer can change the RANGE and use the ZOOM function while in REVIEW.

The present invention preferably stores a maximum of three previous screens of data. To enter the REVIEW mode, it is necessary to press the REVIEW button. The screen will immediately stop stop scrolling. The UP arrow will move the screen to the right, displaying the more recent information. The DOWN arrow moves the screen to the left, displaying older information. If the arrow buttons are held down, the screen will advance until the button is released or the limits of the screens are reached.

An icon beneath the RV descriptor indicates the position of the displayed screen in memory, with the most recent screen being on the right.

To exit the REVIEW mode, press and hold the REVIEW button for 2-3 seconds until a beep is no longer heard and the RV descriptor disappears. The display will resume scrolling with new information.

Adjusting the chart speed will change the scrolling speed of the display. Normally the proper chart speed is automatically selected for optimal viewing. To change the chart speed, it is necessary to press the CHART SPEED button. The CS descriptor will appear in the lower right corner of the display with the chart speed digital indication just below it. The chart speed is adjustable from 1 to 10 using the UP or DOWN arrow keys.

Pressing the UP arrow key will increase the chart speed, and the DOWN arrow key will decrease the chart speed. If the arrow keys are pressed to extend the chart speed beyond its minimum or maximum values, a beep will be heard. Once the desired scrolling speed is selected it is necessary to press the CHART SPEED button again. The chart speed is now set. To return to the normal chart speed, it is necessary to press and hold the CHART SPEED butotn for 2-3 seconds until a beep is no longer heard.

Through the use of a special sensor built into the transducer casing, the temperature of the water surrounding the transducer can be measured and displayed.

When the unit is turned on, the temperature reading is not normally displayed in the lower right hand corner of the screen. The TEMP button is provided so that the temperature reading can be displayed on the screen, and disappears when not activated to avoid confusion with other numbers on the screen. The reading can be redisplayed by pressing the TEMP button again.

The temperature can only be displayed in the automatic mode, otherwise the lower right hand corner of the screen is occupied by a function descriptor.

The present invention has three different alarm functions that are both convenient and useful. The FISH ALARM will signal when any sonar targets have been detected within the range of the alarm settings. The DEPTH ALARM will signal when the bottom has fallen below the set depth level. The SHALLOW ALARM will signal when the bottom rises above the set depth level. Each alarm gives a clear audible chirping sound when an alarm condition has been detected.

To activate the fish alarm, it is necessary to press the FISH ALARM button. A small YELLOW alarm bar will appear on the right side of the screen at a depth of 8 feet. FA TOP will appear in the descriptor area. The top of the alarm can be set by moving the alarm bar to the desired level with the UP/DOWN arrows. Pressing the FISH ALARM button sets the alarm top.

FA BTM will now appear in the descriptor area. Setting of the alarm bottom is by moving the alarm bar to the desired level with the UP/DOWN arrows. Pressing the FISH ALARM button sets the alarm bottom.

The FISH ALARM has now been set to your desired range. It will sound whenever a sonar target appears within this range. The bottom will not set off the alarm. If the viewer wishes to have the FISH ALARM alarm all the way to the bottom, it is necessary to set FA BTM to a level lower than the lowest expected bottom reading.

To disable the FISH ALARM, it is necessary to press and hold the FISH ALARM button for 2-3 seconds until a beep is no longer heard.

To activate the deep alarm, press the DEEP ALARM button. "DA" will now appear in the descriptor area. A YELLOW bar will appear on the right side of the display indicating the current alarm depth setting. A viewer can adjut the alarm to the depth you want by using the UP/DOWN arrow keys. The alarm depth will be shown in the lower left corner of the display while the alarm setting is being adjusted.

Once the viewer has set the alarm level, press the DEEP ALARM key again. The alarm is now set and will sound whenever the bottom falls below the set depth level. The present invention will automatically enable the alarm after 10 seconds if the arrow keys or the DEEP ALARM key have not been pressed. The "DA" descriptor will disappear once the alarm has been set. To disable the alarm, it is necessary to press and hold the DEEP ALARM key for 2-3 seconds until a beep is no longer heard.

To activate the SHALLOW ALARM, it is necessary to press the SHALLOW ALARM button. "SA" will appear in the descriptor area and a small YELLOW alarm bar will appear on the right side of the screen. The alarm can now be adjusted using the UP/DOWN arrow keys. The alarm depth will be shown in the lower left corner of the display while the alarm setting is being adjusted.

It is necessary to press the SHALLOW ALARM button again after selecting the desired level. The alarm is now set and will be triggered whenever the bottom rises above the alarm level chose. The depthfinder will automatically set the alarm after 10 seconds if the arrow keys or the SHALLOW ALARM buttom hve not been pressed. The "SA" descriptor will disappear once the SHALLOW ALARM has been set. To disable the alarm, it is necessary to press and hold the SHALLOW ALARM button for 2-3 seconds until a beep is no longer heard.

Under most circumstances, it will not be necessary to switch out of AUTO SENSITIVITY. The present depthfinder is constantly adjusting its sensitivity to adapt to the sonar environment in which it is operating. The correct sensitivity level is determined by measuring the strength of the returning bottom signal. Consequently, in AUTO SENSITIVITY shallow water generally requires less sensitivity and deep water requires additional sensitivity.

This automatic feature can be overridden. In shallower water, it may not provide enough sensitivity in the automatic mode to reveal smaller fish and finer details of bottom structures. Therefore the MANUAL SENSITIVITY feature is useful when charting the bottom or looking for schools of baitfish.

The present depthfinder stores up to three previous screens of information in addition to the current screen. Each screen represents 32 columns of information, with a column representing the data collected during one sonar sounding. Therefore, there are always 128 columns or four screens of information available for review.

In REVIEW, all four screens can be accessed by pressing REVIEW and then the UP/DOWN arrow keys. UP will move the screen to the right, DOWN to the left. Pressing REVIEW in effect turns the viewing screen into a 32 column wide window which can be moved over the entire 128 column storage area. The position of the window is indicated by the location of a GREEN bar between two RED lines in the descriptor area for REVIEW.

PARTS LIST 0.1uF BYPASS CAPACITOR FROM VCC TO GROUND ON U1-U18
C1 - 1uF
C2 - 0.1uF
C3 - 1000uF
C4 - 2200uF
C5 - 0.1uF
C6 - 0.33uF
C7 - 100uF
C8 - 0.1uF
C9 - 100uF
C10 - 1uF
C11 - 1uF
C12 - 470pF
C14 - 1nF
C15 - 10nF
C16 - 10nF
C17 - 200pF
C18 - 100pF
C19 - 30pF
C20 - 30pF
C21 - 10uF
C22 - 0.01uF
C28 - 0.1uF (MONOCHROMATIC ONLY)
C29 - 0.1uF
CR1 - RD15E - 15 Volt Zener Diode
CR2 - GP30B - Rectifier Diode
CR3 - 8.2V Zener
CR4 - 1SS134 (CR4–CR7 are switching diodes)
CR5 - 1SS134
CR6 - 1SS134
CR7 - 1SS134
CR8–CR14 - 1SS134
L1 - TOKO CAN-1A901HM
Q1 - 2SA1015 TRANSISTOR SWITCH IN POWER SUPPLY
Q2 - 2SD2060 TRANSISTOR SWITCH, CURRENT AMP IN POWER SUPPLY
Q3 - 2SA1328 OUTPUT TRANSISTOR FOR 12 VOLT POWER SUPPLY
Q4 - 2SA1020 OUTPUT TRANSISTOR FOR LM1812 POWER SUPPLY
Q5 - 2SC1815 TRANSISTOR SWITCH FOR LM1812 POWER SUPPLY
Q6 - 2SC2060 CURRENT AMP FOR SONAR POWER AMP
Q7 - 2SC2060 CURRENT AMP FOR SONAR POQER AMP
Q8 - 2SC1815 TRANSISTOR FOR TRANSMIT/-RECEIVE SWITCH
Q9 - 2SC1815 TRANSISTOR CURRENT SINK FOR GAIN ADJUSTMENT
Q10 - 2SC1815 CURRENT MIRROR OF Q9 FOR DECREASED DEPENDENCE ON TRANSISTOR PARAMETERS
Q11 - 2SK549 POWER MOSFET FOR SONAR POWER OUTPUT
Q12 - 2SK549 POWER MOSFET FOR SONAR POWER OUTPUT
Q13 - 2SC1815 TRANSISTOR USED FOR LEVEL TRANSLATION
*Q14 - 2SC1815 TRANSISTOR SWITCH
*Q15 - 2SC1815 TRANSISTOR SWITCH Q16 - 2SC1815 TRANSISTOR SWITCH
Q17 - 2SC2060 (MONOCHROMATIC ONLY) TRANSISTOR SWITCH
Q18 - 2SC2060 (MONOCHROMATIC ONLY) TRANSISTOR SWITCH
ALL RESISTORS ARE 1/5W 10% UNLESS OTHERWISE NOTED
R1 - 2K
R2 - 1K
R3 - 100K
R4 - 100 OHMS 1/4W
R5 - 20K
R6 - 47K
R7 - 2K
R8 - 4.7K
R9 - 100K
R10 - 10K
R11 - 10K
*R12 - 18K
*R13 - 1.2K
R14 - 10K
R15 - 10K
R16 - 5.1K
R17 - 1K
R18 - 1K
R19 - 8.2K
R20 - 100 OHMS
R21 - 10K
R22 - 51 OHMS
R23 - 1.5K
*R24 - 18K
R25 - 1K
R26 - 820
R27 - 180
R28 - 12K
R29 - 51 OHMS
R30 - 8.2K
R31 - 5.6K
R32 - 0.15
R38 - 1K
R39 - 10K
R40 - 10K
R41 - 10K
R42 - 10K
*R43 - 220K
*R44 - 470K
*R45 - 1M
*R46 - 2.2M
*R47 - 220K
R55 - 470K
R56 - 220K
R57 - 100K
R58 - 47K
R59 - 22K
R60 - 10K
R61 - 8.2K (MONOCHROMATIC ONLY)
R62 - 8.2K (MONOCHROMATIC ONLY)
R63 - 47K
R64 - 2.2K (MONOCHROMATIC ONLY)
R65 - 2.2K (MONOCHROMATIC ONLY)
R66 - 1K
R68 - 10K
R69 - 18 OHMS ½ WATT (MLC ONLY)
RP 1 - 10K×9 RESISTOR NETWORK
TL - TOKO 12VXA FORM $P = 0.20 - 0.25 \text{ mm} \times 12T (6T + 6T)$ $S = 0.10 - 0.18 \text{ mm} \times 200T$ TR2 - RADARSONIC 182kHz TRANSDUCER
TR3 - SELF-OSCILLATING BUZZER
U1 - 80C31 MICROPROCESSOR
U2 - 74HC244 ADDRESS BUFFER
U3 - 74HC373 ADDRESS BUFFER/DEMULTIPLEXER
U4 - 74LS138 ONE OF EIGHT DECODER
U5 - 6264FP-20 STATIC RANDOM ACCESS MEMORY
*U6 - 6264FP-20 (MARINE CLC ONLY)
U8 - 2764A-2 PROGRAMMABLE READ ONLY MEMORY
*U9 - NOT USED
U10 - 74HC373 DEMULTIPLEXER/LATCH FOR SENSITIVITY
U11 - MC140497B HEX INVERTER
U12 - 74HC08 QUAD AND GATE
U13 - MC140017B QUAD NOR GATE
U14 - MC14040B 12 BIT BINARY COUNTER FOR TIMING DIVISION
U15 - MC14013B DUAL D FLIP FLOP FOR POWER SWITCH
U16 - MC14040B SAME AS U14
U17 - LM339 QUAD COMPARATOR
*U18 - NOT USED
U19 - LM358 DUAL OPERATIONAL AMPLIFIER
U20 - LM1812 ULTRASONIC SONAR TRANSCEIVER
U21 - 7805 5 VOLT REGULATOR
*VR1 - 50K TRIMPOT
*Y1 - 10.92 MHz CRYSTAL (12 MHZ FOR PROTOTYPES)

While a preferred embodiment of the present invention has been illustrated and discussed, it will be understood that the present invention is not limited thereto, but may be otherwise embodied within the scope of the following claims.

What is claimed is:

1. A depthfinder with depth chart recorder, having a multi-color liquid crystal display, comprising:
   a sonar transmitter means for transmitting sonar signals;
   a sonar receiver means for receiving reflected sonar signals;
   an analyzer means for analyzing received reflected sonar signals;
   a converter means for converting analyzed received reflected sonar signals into signals driving a display;
   a multi-color liquid crystal display screen means driven by said converter means, for displaying along vertical and horizontal coordinates graphic information representing said received reflected sonar signals, according to depth along the vertical coordinate and as a function of time from reception along the horizontal coordinate; and
   means for highlighting on said display screen means a bottom surface contour in a first color and for solidly filling-in an area underlying said bottom surface contour in a contrasting second color, and for displaying a body of water above the bottom surface contour in a third color.

2. A depthfinder as claimed in claim 1, further comprising means for graphically indicating on said display screen means the presence of detected objects closer than said bottom surface contour, said detected objects being indicated in a color permitting a clear distinction between said detected objects and their surroundings.

3. A depthfinder as claimed in claim 1, further comprising a means for displaying on said display screen means descriptor legends corresponding to selectable functions, each said descriptor legend being displayed in a first color while parameters of its corresponding function may be adjusted by an operator, and being displayed in a second color when its functional parameters are set and locked and not adjustable by the operator.

4. A depthfinder as claimed in claim 1, wherein said multi-color liquid crystal display screen means has a first primary color and a second primary color as well as a third color derived by superposing said first color and said second color, and a fourth color corresponding to an off state.

5. A depthfinder as claimed in claim 1, wherein said first primary color is red, said second primary color is green, said derived color is yellow and said fourth color is black.

6. A depthfinder with depth chart recorder, for detecting and displaying underwater information, comprising:
   a microprocessor including system timing and control means, a memory control means, a readout display control means, and X and Y drive means, and a signal analyzer and sonar control means;
   an ultrasonic transducer;
   a means for supplying power to said ultrasonic transducer and to said microprocessor;
   a panel control means;
   a program memory means;
   a multi-color liquid crystal display screen means for displaying underwater information along vertical and horizontal coordinates, according to depth along the vertical coordinate and as a function of time along the horizontal coordinate; and
   a means for highlighting on said display screen means a bottom surface contour in a prominent first color and for solidly filling-in an area underlying said bottom surface contour in a contrasting second color, and for displaying a body of water above the bottom surface contour in a contrasting third color.

* * * * *